Patented Feb. 9, 1932

1,844,662

UNITED STATES PATENT OFFICE

GEORGE D. KING, OF FORT DODGE, IOWA, ASSIGNOR TO UNITED STATES GYPSUM CO., OF CHICAGO, ILLINOIS, A CORPORATION OF ILLINOIS

CELLULAR PRODUCT

No Drawing.   Application filed September 6, 1927.   Serial No. 217,881.

This invention relates to a composition of matter and a process for compounding such a composition.

This invention provides a dry powdered mixture which is fairly stable in long periods of storage, of improved plastic and cohesive properties in wet mixtures, easily compounded, mixed, transported and used to form fireproof shaped cellular masses in whatever places desired. This is done by the simple process of mixing with water to form a plastic mixture, and pouring the plastic mixture where indicated. The dry mix composition itself is composed of a commercially calcined gypsum of improved, creamy and smooth working properties as the mineral plastic base and this ingredient contributes the structural matrix of the composite, light hardened cellular mass.

To the calcined gypsum above mentioned there are also added the following substances or their equivalents: a powdered alkaline-earth carbonate, paper maker's alum (aluminum sulphate) and a crystalline carboxylic organic acid such as benzoic acid or soluble salt of such acid, whereby, when the mixture thus obtained is gauged with water, a strong effervescence will result. Equivalents for the benzoic acid are the other water soluble carboxylic acids of the aromatic hydrocarbons, such as toluic, phthalic and similar acids that contain carboxyl groups directly attached to a benzenoid hydrocarbon ring.

The gas globules liberated during effervescence maintain their stabilized shape and form, within the improved plastic and cohesive mixture which, in turn, rapidly sets and hardens forming the composite cellular structure as described by reason of the fixing structurally in place of these retained globular gas voids.

Many methods of preparing dry powdered mixtures of material have been designed to produce porous cellular masses when mixed with water and poured and hardened but the functioning of such mixtures varies widely, especially in relation to the keeping qualities of the dry mixed product as it is stored prior to use.

A common fault of previously proposed dry mixes of this character lies in this necessary time phase period in marketing these products during which wide variation in character and weight of the resulting mass, when subsequently poured, develops in the dry mixtures as they age.

An object of my invention is to provide a material which overcomes the above mentioned objections and in which this storage and aging actually improve the product in plastic and cohesive properties so that it affords cast gypsum masses of definitely maintained weight and predetermined cellular structure. This is done by the choice of ingredients used. Further objects will be evident from the following disclosures.

In compounding my new dry mixture I may use chemically aged calcined gypsum as described in United States Patent No. 1,370,581 issued March 8, 1921, to Harry E. Brookby. With this I mix a predetermined amount of powdered calcium carbonate or commercial whiting or limestone flour and ground paper maker's alum or aluminum sulphate, or other acid aluminum salt. Ferric sulfate may also be used. These are all common materials for generating carbon dioxide in plastic water mixtures.

My next and novel ingredient is particularly unique for such a dry mix of the above character and composition. This is because it is crystalline in form and not amorphous or colloidal. Calcined gypsum is a strong flocculating agent as is also paper maker's alum, and if such dry mixtures contain colloidal or amorphous substances, the co-mingling mixture reacts in storage to change the character of the colloidal or amorphous ingredients and other physical characters of the mixture. This results in a dry mixture which, when subsequently mixed with water to a plastic state, is of uncertain, lowered consistency and variable fluidity which deleteriously affects the plastic and internal cohesive properties of the wet reacting mixture. Thus, the ensuing composite hardened mass is of uncertain cellular volume, variable in weight and generally inferior in strength, due to the usual effect of an excessive water ratio within the mix which greatly alters the plasticity and internal cohesiveness while in the wet reacting stage.

In contrast, my new dry mixture is stable, using as it does an aged calcined gypsum which exhibits practically constant consistency during storage and also because maintenance of gaseous globules or voids in the plastic reacting mass through its setting and hardening to a composite structure, is assisted by the interaction of my new and novel ingredient, a crystalline organic acid of the class described. This is not acted upon by the intimate contact of the flocculating agents and acid ingredients in the compounded dry mixture during storage.

In carrying out my invention I may compound the ingredients in such proportions that any desired weight of material to afford a unit cubic volume of final hardened cellular composite mass of a given weight may be designated and these designated results may be secured by ordinary labor and workmanship on the job, requiring only the addition of the correct quantities of water to secure the proper mixing consistency and pouring fluidity.

It is contemplated that in marketing this material, the proper amount of water to be used will be designated on each package of the compounded dry mixture. As an example of a dry mix, 30 lbs. of which will yield a set and hardened composite cellular mass, occupying one cubic foot, after being mixed with water and cast, I take

|  | Parts |
|---|---|
| Powdered calcined gypsum having an average consistency of 60 cc. per 100 grams | 100 |
| Finely powdered calcium carbonate | 2.67 |
| Ground aluminum sulphate | 2.67 |
| Powdered crystalline benzoic acid | .06 |

The water necessary for mixing and pouring consistency and fluidity before aging, is 10 lbs. to 15 lbs. of the dry mix. After aging 30 days, the mixture still requires 10 lbs. of water per 15 lbs. of mix and thus is seen to be practically without deteriorating aging effects. The compression value of the resulting hardened cellular mass averages 100 lbs. per square inch.

As an example of my new dry mix formula 12 lbs. of which will yield an extremely light hardened cellular mass occupying one cubic foot when set, is

|  | Parts |
|---|---|
| Calcined gypsum as before | 100 |
| Powdered calcium carbonate | 6 |
| Ground aluminum sulphate | 10 |
| Powdered crystalline benzoic acid | .25 |

Other dry mixture compositions can be made which produce intermediate cellular structures by manipulation of the different essential ingredients and I have used a range up to 50 lbs. of dry mix to yield one cubic foot of hardened cellular mass extremely hard and durable.

In the foregoing formulae, the parts specified are by weight.

The benzoic acid used in the above formulas may be replaced by other organic aromatic carboxylic acids in which a carboxyl group is directly attached to a benzenoid ring. Such acids comprise the monocarboxylic acids of the benzene series such as toluic and xylic, or the dicarboxylic acids as exemplified by phthalic acid. Other acids as naphthoic acids may also be employed.

The compression values of the final cellular products vary with the density, the less porous or denser having higher structural values. The thermal insulating properties of the final poured and hardened dry cellular mass varies inversely as the density. The denser the mass, the less the insulating value and the more porosity or cellular structure obtained, the more the insulating value from a conductivity standpoint.

Having thus described my invention, what I claim is:

1. A cellular composition of matter comprising the composite set and hardened structure resulting from the chemical and physical interaction of sulphate of aluminum, an aromatic carboxylic acid having a carboxyl group attached to a benzenoid ring, and calcium carbonate within a plastic mixture of calcined gypsum and water.

2. A powdered dry mixture comprising a major ingredient that sets and hardens with water, gas evolving substances and a crystalline organic acid of the aromatic hydrocarbon ring series of acids containing a carboxyl group attached to the benzenoid ring.

3. A powdered dry mixture comprising as a major ingredient, a pre-aged alkaline earth sulphate that sets and hardens with water, intimately co-mingled with paper maker's alum, an insoluble carbonate and benzoic acid.

4. A dry mix powdered product which reacts with water to produce a composite hardened cellular structure comprising chemically preaged calcined gypsum, gas evolving substances and benzoic acid.

5. A dry mixed powdered product comprising calcined gypsum, gas evolving substances and a homolog of benzoic acid.

6. A dry mixed product reacting with water to produce a composite hardened cellular structure comprising a calcined alkaline earth sulphate, sulphate of aluminum, calcium carbonate and benzoic acid.

7. A cellular composition of matter comprising a set and hardened structure resulting from the chemical and physical interaction of a plastic mixture comprising calcined gypsum, water, aluminum sulfate, benzoic acid, and calcium carbonate.

In witness whereof, I have hereunto subscribed my name.

GEORGE D. KING.